May 14, 1963
D. E. WURSTER
3,089,824
GRANULATING AND COATING PROCESS FOR UNIFORM GRANULES
Filed April 30, 1959
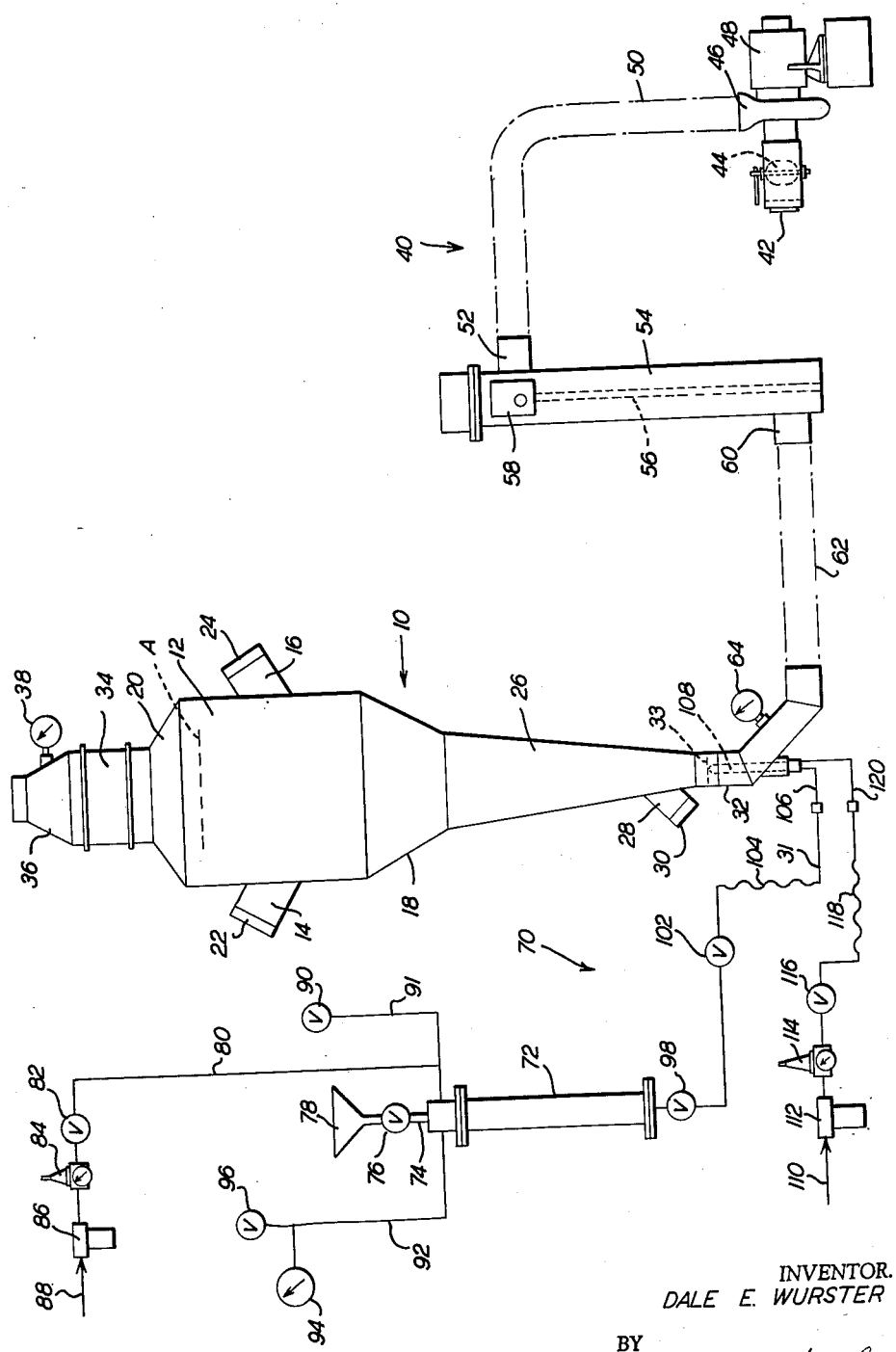
INVENTOR.
DALE E. WURSTER
BY
Adams Forward & McLean
ATTORNEYS

3,089,824
GRANULATING AND COATING PROCESS FOR UNIFORM GRANULES
Dale E. Wurster, Madison, Wis., assignor to Wisconsin Alumni Research Foundation, Madison, Wis., a corporation of Wisconsin
Filed Apr. 30, 1959, Ser. No. 810,128
8 Claims. (Cl. 167—82)

The present invention relates to an improved granulating process and resulting granules adaptable for use in the manufacture of compressed tablets.

In the tablet art, it is well known that the preparation of a granulation, i.e. formation of granules, is necessary where the medicament dispersed in an inert pharmaceutical carrier will not, prior to granulating, compress under normal or practical pressures into a good, strong or firm compressed tablet. In the well known wet granulating process this ordinarily involves (1) preparing the granulating solution or binder, (2) weighing the active medicament and mixing the same with an inert powdered pharmaceutical diluent, (3) moistening the powdered medicament mixture with the proper amount of binder solution, (4) screening the moistened powder through a screen of proper mesh to form granules, (5) drying the granules, (6) grinding or screening the dried granules to the final and proper size for suitable compressing, (7) adding a lubricant to the ground granules, and (8) compressing the lubricated granules into the finished tablets. See Silver et al., "Manufacture of Compressed Tablets," F. J. Stokes Machine Co., Phila., chapter III (1944). The four granulating operations (steps 3–6) are particularly objectionable (a) because they are time-consuming, e.g. require one to three days or more, and (b) because the steps involved in the formation of proper granular material are highly critical and difficult to control. At best, even with the services of an operator highly skilled in the granulation art, the ground granules are not uniform in size or shape and their flow characteristics, which are relatively low, leave much to be desired. In view of this the art has been actively searching for improved commercially practical granulating processes free from the disadvantages enumerated above as well as others noted below.

The principal object of the present invention is to provide a low cost granulating process which is extremely rapid, e.g. requiring minutes as compared to days.

Another object of the present invention is to provide an improved granulating process which is relatively easy to control and requires only the services of a semiskilled operator.

Another object of the present invention is to provide a granulating process capable of producing free flowing granules of uniform size and shape.

Another object of the present invention is to provide a process for producing granules of the type desired without the slow and tedious screening, drying and grinding steps heretofore required in wet granulating processes.

Another object of the present invention is to provide an improved lubricated granulation for use in tablet manufacture.

Still other objects will be apparent as the description proceeds below.

The process of the present invention can be carried out in apparatus of the type described in Wurster Patent No. 2,799,241 and also in the apparatus of the type illustrated by the drawing of the present application. Essentially, the process comprises (1) suspending small particles in air, (2) building up the particles with granulating material, and (3) coating the resulting granules when at the desired size with a lubricant.

The process of the present invention can be carried out in various ways. One of the preferred is to suspend small particles, e.g. seeds, crystals or the like of about 20–200 mesh or smaller, of the medicament per se in an air stream in a tower and then contact the suspended particles with an atomized mixture of the granulating materials to build up the particles to the desired size granules. The particle of the medicament which serves as a nucleus for the granule can be replaced by an inert nucleus, e.g. a sugar seed, coated with the medicament or by a particle made up of the medicament carried in an inert pharmaceutical diluent, and the process carried out in a similar manner. Another way, is to suspend an inert nucleus per se, e.g. a sugar seed or the like, in the air stream in a tower and then build up the nucleus to the desired size granule with an atomized mixture of the granulating materials having the medicament dissolved or dispersed therein.

The final step, after the granules are of proper size, is to coat the granules with a lubricant. This can be readily done by coating the granules with atomized lubricant while the granules are still suspended in the air stream.

The granulating materials used in the present invention are non-toxic, inert materials of the normal or common type of diluents and disintegrating agents used in the granulating art. Illustrative examples are sugars such as lactose, sucrose, glucose (Corn Syrup), etc., powders such as starch, talc, calcium and magnesium carbonates and the like, polyethylene glycol (e.g. Carbowax), gums such as acacia, tragacanth, etc., cellulose derivatives including ethyl-cellulose, etc., and various mixtures of the same. To apply to the suspended particles, the granulating materials are dispersed (dissolved and suspended) in a volatile liquid such as water or a volatile organic solvent such as the lower alkanols (e.g. methanol, ethanol, isopropanol), acetone, etc., or combinations of the same including water with the water miscible organic solvents. The granulating material-solvent combination used in the present invention is such that at least one of the granulating materials is in solution and at least one of the granulating materials is in suspension in the solution. An illustrative granulating composition, for example, is made up of a mixture of the following ingredients.

Corn starch powder
Sucrose powder
Acacia powder
Polyethylene glycol 6000

When water is used as the volatile liquid all of the ingredients are soluble and in aqueous solution form except the starch which is water insoluble and thus in suspension form. With this combination the atomized soluble materials and starch will be deposited on the particles or nuclei suspended in the air stream and, upon evaporation of the water, the powdered starch will be entrapped by the resulting solid mixture of soluble materials. When ethanol is used as the liquid for the same granulating composition all of the ingredients are insoluble and in suspension form except the polyethylene glycol (Carbowax) which is alcohol soluble and thus in solution form. With this combination, after evaporation of the solvent, the powdered starch, sucrose and acacia mixture will be entrapped on the particles, in a matrix of the polyethylene glycol.

In the above process, it will be apparent that the powdered insoluble material in suspension is trapped on the drug particle or nucleus suspended in the air stream by the soluble material upon evaporation of the solvent. As distinguished from this, the conventional wet granulating process employs viscous acacia solutions, 10% starch paste and the like as binders to cause small particles (powders) to adhere. In this, granule formation in the present process thus differs materially from the conventional granulating process in that binders, in the above sense, are not necessary.

The lubricant applied to the granules after they have reached the desired size can be any of the common lubricants such as magnesium stearate, mineral oil and like inert materials used to prepare lubricated granulations for use in the compressed tablet art. Like the granulating materials, the lubricant, if solid, should be atomized as a solution or as a fine suspension in either water or the volatile organic solvent or aqueous organic solvent systems referred to above. Where the lubricant is in liquid form, e.g. is an oil, it can be atomized and applied as such without solvent. The application of the lubricant by this method readily gives complete and uniform surface coverage of the granules with the lubricant. In this alone, the present process represents a distinct advance over the mixing of the lubricant with the granules as practiced heretofore.

The following examples will serve to illustrate the invention.

*Example I*

| | Gms. |
|---|---|
| Nucleus: Sucrose (granulated sugar or nonpareils—35–40 mesh) | 2500 |
| Granulating materials: | |
| Phenobarbital powder | 810 |
| Acacia powder | 150 |
| Lactose | 515 |
| Aqueous alcohol (50% ethyl alcohol), q.s. ad 3000 ml. | |

The granulating materials are thoroughly mixed to provide a mixture having most of the phenobarbital in solution, some of the lactose in solution and most of the acacia in suspension. The sucrose particles, acting as inert nuclei for the granules, are suspended in the tower in fluidized bed form using air at a temperature of about 45° C. The granulating materials are then atomized into the air stream at about 100 ml./min. At this rate, this operation can be completed in about 30 minutes.

| Lubricating materials: | Gms. |
|---|---|
| Corn starch powder | 250 |
| Talcum powder | 250 |
| Magnesium stearate | 25 |
| Ethyl alcohol (95%), q.s. ad 2000 ml. | |

The lubricating materials are first thoroughly mixed to provide a mixture with some of the magnesium stearate in solution and the corn starch and talcum in suspension. With the previously prepared phenobarbital granules suspended in the tower in fluidized bed form using air at room temperature, the lubricating materials are atomized into the air stream at about 75 ml./min. At this rate this operation can be completed in about 27 minutes. The resulting lubricated granulation (5000 gms.) can be used to make 50,000 ¼ grain tablets weighing about 100 mg. each, in accordance with standard practices in the tableting art.

*Example II*

| | Lbs. |
|---|---|
| Nucleus: Sodium chloride crystals | 10 |
| Granulating materials: | |
| Carbowax (polyethylene glycol 6000) | 0.5 |
| Sucrose | 2.0 |
| Starch powder | 1.0 |
| Lactose | 1.0 |
| Distilled water, q.s. ad 4000 ml. | |

The granulating materials are thoroughly mixed to provide a mixture with the Carbowax and most of the sugars in solution and the starch in suspension. The sodium chloride crystals, acting as therapeutically active nuclei for the granules, are suspended in the tower in fluidized bed form using air at a temperature of about 50° C. The granulating materials are then atomized into the air stream at about 50–75 ml./min.

| Lubricating materials: | Lb. |
|---|---|
| Talcum powder | 0.35 |
| Magnesium stearate | 0.15 |
| Ethyl alcohol (95%), q.s. ad 1000 ml. | |

The lubricating materials are first thoroughly mixed to provide a mixture with magnesium stearate in solution and the talcum powder in suspension. With the previously prepared sodium chloride granules suspended in the tower in fluidized bed form using air at room temperature, the lubricating materials are atomized into the air stream at about 75 ml./min. The resulting lubricated granulation (15 lbs.) can be used to make 14,000 5 gr. tablets weighing about 7.0 grains each.

*Example III*

This example follows Example I with the acacia being replaced by an additional 150 gms. of lactose. The resulting granulating material mixture contains most of the medicament (phenobarbital) in solution and about equal amounts of the lactose in solution and in suspension. In this example, as in Example I, the granulating material in suspension is entrapped on the sucrose nuclei by both the lactose and medicament in solution. In Example II, the Carbowax can be replaced in whole or in part by polyvinyl alcohol or polyvinyl pyrrolidone (P.V.P.). In all of the examples, the lubricating materials can be made up of talcum powder (hydrous magnesium silicate) alone, magnesium stearate or calcium stearate alone, mineral oil alone, etc. The use of a combination containing some lubricating material in suspension and some in solution, as in the examples, provides for particularly well lubricated free flowing granules. Also, as the process of the present invention provides ready means for completely covering the granules with a thin coating of lubricant, less lubricant can be used in the present process than is ordinarily required for adequate lubrication in prior granulating processes. This makes for strong tablets as it is known that the tablets tend to become weaker as the amount of lubricant present on the granulation increases. Proper lubrication also improves the flow properties. The granules or nuclei can also be advantageously coated in certain cases with atomized Carbowax or the like dissolved in water or an inert volatile solvent such as the lower aliphatic alcohols.

To provide for necessary flow in the prior granulating processes, it has also been considered that the finished granules should be at least as big as about 12–14 mesh. This has been found unnecessary in the present process as finished granules from 12 to 80 mesh or greater (i.e. still smaller size) have been prepared with excellent flow properties.

Gas other than air such as nitrogen can be employed in the present invention during either or both of the granulating or lubricating operations but as the overall time element involved is so short the use of inert gas may not be necessary even with medicaments having a tendency to be unstable in the presence of air. For most purposes, even with crystals of vitamins or other medicaments serving as the nuclei, the use of air as the suspending medium has proven satisfactory.

The examples described above are merely illustrative and it will be understood that the solvents (water or organic or mixtures of the same) can be varied as desired for particular granulating operations. The same is true of the atomizing rate as well as the temperature of the gas used to maintain the fluidized bed. Optimum conditions for any granulating operation can be readily ascertained by preliminary test.

The lubricated granules produced as described above are uniform in size and, unlike granules produced by prior processes, are substantially spherical in shape. In view of this, the granules are exceptionally high in the desired free flowing characteristic, e.g. it has been noted that they will "run in a tablet press like water." See Chilson, Francis, Drug and Cosmetic Industry, 84, No. 2, 217 (February 1959). This free flowing property is highly desired not only because it aids in feeding the granules in the press and to the die for tableting, but also because this property aids in the formation of firm tablets, e.g. reduces the number of defective tablets or "rejects," frequently encountered, due to incomplete filling of the die cavity, with granules which have relatively poor flow characteristics.

The improved granulating process of the present invention is extremely rapid, requiring relatively few minutes up to about one-half an hour as compared to one to three days or more as required for the conventional wet granulating process. With highly volatile solvents such as ethyl alcohol or acetone, the process can be speeded up some although solvents of this type are not necessary as far as drying is concerned, as the drying is continuous and for the most part, virtually instantaneous using water and heated air as the suspending medium. In other words, drying as a separate step (ordinarily carried out by spreading the granules on trays in the conventional process) is eliminated. While organic solvents are not essential for rapid granulating, anhydrous solvents should be used and can be used in the present process without modification, where the medicament has a tendency to hydrolyze, undergo undesirable reactions, etc. in aqueous mediums. Inert gas (nitrogen) can also be used in place of air as the suspending medium if the medicament has a tendency to react with the oxygen in air as previously noted above.

In addition to eliminating the drying step as a special step, the process of the present invention also completely eliminates the screening and grinding steps. This along with the elimination of the time-consuming drying step, saves a lot of time including labor and operating expense. The process of the present invention also eliminates the moistening or wetting and thorough mixing of the dry granulating materials with the proper amount of binder solution. This is particularly advantageous as this operation frequently referred to as "granulating," is especially critical and is known to involve a true "art" requiring the services of a highly skilled experienced operator. As distinguished from this, the process of the present invention, including the all important size of the finished granules, is easy to control and requires only the services of a semi-skilled operator.

In the preferred process, as noted above, the inert granulating materials are applied to the particle or nucleus containing the active medicament while the particle or nucleus is suspended in the gas stream. In the resulting granule the nucleus of medicament is completely covered and protected by the inert granulating materials. This feature is of special importance where the medicament used tends to be unstable when exposed to light, air, etc. It is unobtainable with the procedures employed in conventional processes where the medicament is mixed with the granulating materials and a substantial part of the medicament remains exposed in the granule. This protective feature is also of special importance where a mixture of granules containing different medicaments which tend to be incompatible when in contact with each other, are to be compressed into a single tablet. This presents no problem using the preferred process of the present invention as the medicament is completely covered with inert granulating material. "Fines," e.g. powdered starch, etc., frequently added in small amounts to obtain smooth tablets, can be added, if desired, to the granules produced by the process of the present invention. They are not essential, however, to obtain a satisfactory tablet, and where an exceptionally smooth tablet is desired it can be obtained by incorporating a low melting substance such as polyethylene glycol 2000–6000 (e.g. Carbowax) into the granulating mixture.

The granules of the present invention can be compressed into tablets, in accordance with standard procedures and the resulting tablets can be coated with various materials such as sugary coatings, film coatings, etc., also in accordance with standard practices in the art. Coatings are preferably applied to the tablets while suspended in an air stream using apparatus of the type illustrated in Wurster Patent 2,648,609 and in the accompanying drawing. The granules of the present invention can also be press coated employing the ordinary compression coating substances used in the press coating art. Conventionally this is carried out by surrounding a core of the medicament with the press coating substances and then forming a tablet in a single compression stage with a conventional tablet machine. With a previously compressed tablet as the core and a press coating containing another medicament, a tablet within a tablet can also be prepared using the press coating procedure. When the granules of the present invention are used in place of the single core the resulting tablet looks the same as a press coated tablet, but instead of containing a single core of medicament, the tablet, depending on the number of granules used, will contain a multiple of particles of medicament. This makes for relatively fast release of the medicament and when this is desired and press coating is to be used, the granules of the present invention can be advantageously used in place of the conventional core of medicament ordinarily employed in press coating.

Illustrative examples of medicaments which can be mixed with the granulating materials as in Example I are codeine sulfate, ephedrine sulfate, ascorbic acid (vitamin C), atropine sulfate, morphine sulfate, penta-barbital sodium, etc. Examples of medicaments which can serve as nuclei as in Example II are powdered digitalis, sodium salicylate, acetylsalicylic acid, ferrous sulfate, sodium bicarbonate, nicotinic acid, p-aminobenzoic acid, sulfamerazine, quinidine salts, etc.

The accompanying drawing is a somewhat diagrammatic illustration in elevation of a preferred arrangement of apparatus for carrying out the process of the invention. Basically the illustrated apparatus includes a tower 10, an air supply system 40 and a granulating material feed system 70.

Tower 10 is a vertically elongated hollow shell, constructed of rigid, hard transparent synthetic resin (e.g. Lucite), or similar material and includes a centrally cylindrical bell 12 provided with lateral charge ports 14 and 16. At its lower end bell 12 includes a frustoconical lower end section 18, sharply reducing the diameter of the opening into bell 12 at its lower end. Similarly, the upper end of bell 12 is reduced to a much smaller diameter by a frustoconical upper end section 20. Thus bell 12 including its lower and upper sections 18 and 20 encloses a chamber which is accessible at its upper and lower ends through openings of substantially smaller diameter than the main portion of bell 12 and which is further accessible by means of lateral openings in the form of charge ports 14 and 16 which can be closed by suitable caps 22 and 24 during operation.

Depending from lower section 18 of bell 12, tower 10 is further provided with an elongated throat section 26 which communicates at its upper end with the opening into lower bell section 18 and which at its lower end is tapered to still a further reduced diameter. Near its lower end throat 26 is provided with a downwardly inclined lateral discharge port 28 which is provided with a removable cap 30. The lower end of throat section 26 terminates in a short cylindrical nozzle section 32 into which air supply system 40 and granulating material feed system 70 are connected. A fine mesh grid 33 is mounted in the upper end of nozzle section 32 extending completely across the interior of such section.

Above upper bell section 20 tower 10 is further provided with a short vertical cylindrical disengaging section 34 which can be interiorly provided with transversely positioned screens or the like to facilitate disengagement of entrained fines. Above disengaging section 34 tower 10 is further provided with a frustoconical exhaust connection 36 reducing the diameter of tower 10 at its outlet end suitably for connection to a stack or fine or solvent recovery system. Exhaust connection 36 desirably is provided with a thermometer 38 having an exterior indicator for indicating the interior temperature of exhaust gases in exhaust connection 36.

Air supply system 40 includes an inlet conduit 42 for connection to a source of filtered air of controlled humidity. Inlet conduit 42 leads through a manually operable butterfly valve 44 to the suction side of a centrifugal air blower 46 which is driven by a motor 48 and which on its discharge side is connected through a flexible conduit 50 leading to the inlet 52 of a heater 54.

Heater 54 is a closed cylindrical vessel internally provided with an electrical resistance heating element 56, for which a control rheostat 58 is mounted exteriorly of heater 54. Inlet fitting 52 is connected to one end of cylindrical heater 54, and an outlet fitting 60 for heater 54 is provided at its other end. Outlet 60 connects heater 54 to a conduit 62 leading to the lower end of nozzle section 32 at the lower end of tower 10. Adjacent its connection to nozzle section 32 air conduit 62 is provided with a thermometer 64 for measuring the temperature of air as it enters nozzle section 32 and which is provided with an external indicator.

Granulating material feed system 70 includes a closed upright cylindrical receptacle 72 for receiving a charge of granulating material for a particular operation. At its upper end receptacle 72 is provided with an inlet fitting 74 which is connected through a valve 76 to an upright funnel 78 through which receptacle 72 can be charged with granulating materials when valve 76 is opened. Also at its upper end receptacle 72 is connected through an air line 80 including a shut-off valve 82, a pressure reducing valve 84 and on air filter 86 to an air inlet line 88. Thus air in line 88 suitably taken from a compressed air source is first passed through filter 86, then reduced to a controlled pressure by valve 84 and can be applied to pressure receptacle 72 through line 80 by means of valve 82. Desirably a pressure relief valve 90 set to release at a somewhat higher pressure than is normally desired in line 80 is connected to line 80 by an auxiliary air line connection 91 in order to prevent overpressuring of receptacle 72. The upper end of receptacle 72 desirably is also provided with an auxiliary air line 92 leading to a pressure gauge 94 and to a manually operable vent valve 96.

The lower end of receptacle 72 is connected through a shut-off valve 98 as indicated which in turn is connected through an adjustable metering valve 102 to a flexible hose connection 104 which is coupled to the inlet connection 106 of an atomizing nozzle 108, extending into the lower end of nozzle section 32 of tower 10.

The granulating material feed system further includes a second air inlet 110 also suitably connected to a source of compressed air to admit air through an air filter 112 to a pressure reducing valve 114, the outlet, regulated pressure side of which is connected to a shut-off valve 116 leading to a flexible hose connection 118 which is coupled to a second inlet connection 120 leading into nozzle 108. Connections 106 and 120 terminate directed toward each other at an angle to form atomizing nozzle 108 in nozzle section 32 below grid 33.

In operation with valves 82, 98, 102 and 116 closed and valves 76 and 96 opened the granulating materials are charged to funnel 78 permitting receptacle 72 to be filled with a sufficient quantity of granulating material for a single batch operation of the apparatus while the air in receptacle 72 is displaced through vent 96. Valves 76 and 96 are then closed and valve 82 is then opened. In typical operation pressure regulating valve 84 is adjusted to admit air through valve 82 and line 80 into the upper end of receptacle 72 at a pressure preferably on the order of about 20 p.s.i.g. Suitably relief valve 90 is set to release at a pressure such as 22 p.s.i.g. in order to prevent excess pressure build-up in receptacle 72. Pressure regulating valve 114 on the atomizing air stream line is similarly adjusted to admit air to valve 116 at a pressure preferably on the order of about 20 p.s.i.g. Valves 98 and 116, however, remain closed.

Cap 22 or 24 is then removed and tower 10 is charged with the particles which serve as nuclei for the granulation. Grid 33 will, of course, retain this charge of particles and hold them within throat section 26. The cap 22 or 24 is then replaced and motor 48 is started to draw air through inlet 42 and pass it through heater 54 into nozzle section 32 of tower 10.

Temperature control rheostat 58 is adjusted to control the heat output of element 56 to heat the air stream in heater 54 to maintain the desired heating temperatures indicated by inlet and outlet thermometers 64 and 38 on tower 10 as discussed hereinafter.

Butterfly valve 44 is adjusted to control the linear velocity of air in tower 10 at a rate which will hold the particulate charge material in tower 10 in an expanded fluidized bed. The air rate should be insufficient to carry the particles of charge in suspension upwardly into disengaging section 34 in tower 10 but should be sufficient to maintain the upper surface of the bed of charged particles near the upper end of section 26 or upper end of bell section 12 of tower 10 as indicated by dashed line A in the drawing. It will be noted that by reason of the tapered throat 26 construction, relatively higher velocities of supporting air will be found in the lower portion of tower 10 than in bell section 12. As a consequence the bulk of the particulate charge material can be held in a dense fluidized mass in bell section 12 and materials falling out of suspension into throat 26 will be rapidly carried back up into the bed. The dense bed, however, will ordinarily extend substantially down into throat section 26 and with an appropriate charge and air control all or substantially all of the granulating operation can take place in this section.

The granulating operation is then commenced by opening valves 98 and 116. Thus the air pressure head on receptacle 72 forces the liquid granulating material out through valve 102 to nozzle 108 while air from conduit 110 similarly enters nozzle 108 to atomize the granulating material as it exits nozzle 108. The metering rate of valve 102 is, of course, adjusted to admit the granulating composition through nozzle 108 at the desired rate. The atomized granulating materials are carried in the main air stream from conduit 62 upwardly through nozzle section 32 into throat 26 and bell section 12 where the granulating materials impinge on and adhere to the particulate charge materials.

When the granulating operation has been completed, operation is shut down by the reverse procedure, that is, valves 116 and 98 are first closed; thereafter heater 54, if used, is deactivated by turning down rheostat 58; and finally motor 48 is shut down. The bed of granulated materials in tower 10 then falls to the lower end of tower 10 resting on screen 33 and can be withdrawn by removing cap 30 of discharge port 28 at the lower end of throat 26.

Throat section 26 can be cylindrical in form and like the complete tower can be made of metal such as steel in place of synthetic resin. The atomized material can also be introduced into the air stream at different positions. Atomizing nozzle 108, for example, can be positioned at about the middle of section 26, in which case screen 33 can be omitted to provide for recovery of the granulation from the bottom of the tower.

I claim:

1. In the granulation art, the improved process of preparing free flowing granules of substantially uniform size and shape, the steps which comprise: suspending small solid particles of substantially uniform size and shape in a gas stream in fluidized bed form as nuclei for the granules, introducing an atomized granulating mixture having granulating material in solution and finely divided granulating material in suspension in a volatile liquid into the gas stream maintaining the nuclei in the fluidized bed, and then lubricating the resulting granules while in fluidized bed form by introducing an atomized liquid lubricating composition into the gas stream maintaining the granules in the fluidized bed.

2. The process of claim 1 where the nuclei are 20–200 mesh and the gas is an air stream.

3. The process of claim 1 where the nuclei is made up of a therapeutically active medicament.

4. The process of claim 1 where the granulating materials are selected from the group consisting of polyethylene glycol 6000 and powdered sugar and starch, and the lubricating materials are selected from the group consisting of talcum powder and magnesium stearate.

5. The process of claim 1 where the nuclei is inert and the granulating mixture contains a therapeutically active medicament.

6. The process of claim 5 where the nuclei are sugar seeds.

7. Granules prepared in accordance with claim 1, being characterized by nuclei surrounded with the granulating material in suspension entrapped thereon by the granulating material in solution, and by having the granule covered by an outer coating of lubricant.

8. The improved process of preparing free-flowing granules of substantially uniform size and shape which comprises suspending small solid particles of substantially uniform size and shape in an upwardly flowing air stream in fluidized bed form as nuclei for the granules, introducing into the upwardly flowing air stream maintaining the nuclei in the fluidized bed, an atomized mixture consisting of solid granulating material and a volatile liquid, said atomized mixture containing granulating material in solution and finely divided granulating material in suspension in said liquid.

References Cited in the file of this patent

UNITED STATES PATENTS

| | | |
|---|---|---|
| 2,059,983 | Dent | Nov. 3, 1936 |
| 2,579,944 | Marshall | Dec. 5, 1951 |
| 2,648,609 | Wurster | Aug. 11, 1953 |
| 2,799,241 | Wurster | July 16, 1957 |
| 2,865,868 | McKinley | Dec. 23, 1958 |

OTHER REFERENCES

Manufacture of Compressed Tablets, Silver and Clarkson, copyright 1944, F. J. Stokes Machine Co., pp. 5–23.